United States Patent
Caire et al.

(10) Patent No.: US 9,513,787 B2
(45) Date of Patent: Dec. 6, 2016

(54) MAGNETIC-LIKE USER INTERFACE FOR COMBINING OBJECTS

(75) Inventors: Giovanni Caire, Turin (IT); Danilo Gotta, Turin (IT); Marisa Porta, Turin (IT); Giovanna Sacchi, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 202 days.

(21) Appl. No.: 13/977,335

(22) PCT Filed: Dec. 29, 2010

(86) PCT No.: PCT/EP2010/070842
§ 371 (c)(1),
(2), (4) Date: Jun. 28, 2013

(87) PCT Pub. No.: WO2012/089248
PCT Pub. Date: Jul. 5, 2012

(65) Prior Publication Data
US 2013/0275906 A1   Oct. 17, 2013

(51) Int. Cl.
*G06F 3/14*   (2006.01)
*G06F 3/0484*   (2013.01)
*G06F 9/44*   (2006.01)

(52) U.S. Cl.
CPC ............. *G06F 3/04842* (2013.01); *G06F 8/34* (2013.01)

(58) Field of Classification Search
CPC .................................... G06F 3/14; G06F 3/17
USPC ....... 715/771; 702/19, 182; 706/12; 709/206
See application file for complete search history.

(56) References Cited

U.S. PATENT DOCUMENTS

| 5,754,179 A | 5/1998 | Hocker et al. |
| 7,013,238 B1 * | 3/2006 | Weare .............. 702/182 |
| 8,566,256 B2 * | 10/2013 | Hueter et al. ................ 706/12 |
| 2004/0001094 A1 | 1/2004 | Unnewehr et al. |
| 2006/0200434 A1 * | 9/2006 | Flinn et al. ................ 706/12 |
| 2007/0106479 A1 * | 5/2007 | Geerts et al. ............... 702/19 |
| 2008/0077874 A1 | 3/2008 | Garbow et al. |
| 2008/0126987 A1 | 5/2008 | Meschian et al. |
| 2008/0168364 A1 | 7/2008 | Miller et al. |
| 2012/0124147 A1 * | 5/2012 | Hamlin et al. .......... H04L 51/36 709/206 |

FOREIGN PATENT DOCUMENTS

| CA | 2 739 514 | 5/2010 |
| EP | 0 747 804 | 12/1996 |

OTHER PUBLICATIONS

International Search Report Issued Sep. 5, 2011 in PCT/EP10/070842 Filed Dec. 29, 2010.

* cited by examiner

*Primary Examiner* — Ruay Ho
(74) *Attorney, Agent, or Firm* — Oblon, McClelland, Maier & Neustadt, L.L.P.

(57) ABSTRACT

A methodology for assisting a user in a combination of objects, e.g. functional blocks, through an intuitive user interface which can simulate effect of magnets, and including: representing a high affinity degree between two blocks in a magnetic-like style as a simulated attraction giving a feedback to the user. Such attraction feedback can be represented in different ways, from a simple visual representation to a proper mechanical feedback conveyed to the user through the input device used for making the block selection, e.g. a mouse, a track point, or a joystick.

19 Claims, 8 Drawing Sheets

MAGNETIC-LIKE USER INTERFACE FOR COMBINING OBJECTS

FIELD OF THE INVENTION

The present invention relates to the data processing field and more particularly to a method and system for assisting a user in the composition of objects (e.g. functional blocks) according to an affinity degree by means of an intuitive user interface.

BACKGROUND OF THE INVENTION

Information technology increasing evolution and progressive integration between the world of information technology and the world of media and entertainment bring new requirements on system architectures. An increasing number of formats, interfaces and access protocols must be dealt with at the same time. In this environment it is extremely important the availability for the users of fast and intuitive tools for combining different components together. In particular, those users without an advanced technical skill need an easy access to complex technologies, but on the other hand the interface tools must be sufficiently powerful and flexible to allow an expert user to exploit all the possible features of a data processing system.

A current trend which provides good results is the functional block approach, according to which a plurality of basic functional blocks can be combined together to assemble a complete service.

Web Services technology is one of the possible examples of such functional block approach. It can be well considered a de facto standard for system integration. It provides some basic components: a commonly understood language (WSDL) for defining access interfaces for accessing a service through the web, independently from the implementing technology actually used and a protocol (SOAP) integrated with the Web environment, for invoking the service.

It is more and more usual to provide Mash-Up environment, i.e. a combination of contents or services from one or more applications, which creates a new application that can include topics, information and services from several different sources. Mashup combines some of the most innovative features of Web 2.0: the vision of the network as a platform where, thanks to shared protocols, applications are able to communicate with each other, the tendency on the part of best known web sites to make contents and services freely available, and the participation of users, who increasingly become independent producers of contents and services. The result of a mashup can be unique and unprecedented, especially for the opportunity to mix different information types, and it can be really innovative if tools are made available that allow an easy mashup design and creation also to users with minimal technical knowledge.

Gadget of Google Desktop and Pipes of Yahoo are two examples of important technology trend in the field of functional blocks architectures. These two examples address both data composition and procedures.

Even though Web Services technique ensures the syntactic compatibility for systems communications, they still have strict limits as far as semantic characterization is concerned.

Several attempts have been made in the area of Semantic Web to try to define rules and standards for a semantic characterization of a web service or a system. For example, languages such as OWL-S and SAWSDL, allow to describe the semantic of an operation performed through a Web Service and of the related input and output, even for users with a low technical skill.

To help in assisting users (in particular un-experienced users) in handling the combination of functional blocks it would be desirable to provide an intuitive and flexible interface which can guide users in such combination, maybe giving an immediately perceivable indication of which combination are expected to be successful.

U.S.2008/0126987 discloses a method for graphically representing compatible workflow components to a user. The method includes graphically displaying, in a graphical user interface, a plurality of steps in a workflow. A user's selection is received, wherein the selection is for at least one step in the plurality of steps. The user's selection denotes at least one selected step. At least a portion of the graphical user interface is dynamically populated for displaying a list with at least one workflow component that is compatible to accept an output from the selected step. The list can also display at least one workflow component that can provide an output to the selected step. The workflow component is selectable by the user so that it can be added to the workflow.

Several techniques are now available to provide sensorial feedbacks to a user of a data processing system but, to Applicant's knowledge, none of them have ever been implemented in the field of Web Services or, more generally in the combination of functional blocks through a data processing system.

U.S.2007/01393375 discloses a method and apparatus for providing force feedback to a user operating a human/computer interface device in conjunction with a graphical user interface (GUI) displayed by a host computer system. A physical object, such as a joystick or a mouse, controls a graphical object, such as a cursor, within the GUI. The GUI allows the user to interface with operating system functions implemented by the computer system. A signal is output from the host computer to the interface device to apply a force sensation to the physical object using one or more actuators. This desired force sensation is associated with at least one of the graphical objects and operating system functions of the graphical user interface and is determined by a location of the cursor in the GUI with respect to targets that are associated with the graphical objects. The graphical objects include icons, windows, pull-down menus and menu items, scroll bars ("sliders"), and buttons. The force sensation assists the user to select a desired operating system function or physically informs the user of the graphical objects encountered by the cursor within the GUI.

SUMMARY OF THE INVENTION

According to a first aspect of the present invention there is provided a method of assisting a user in combining objects in a user interface including a plurality of objects, each object being associated with a set of parameters, the method including: responsive to the user selecting at least a first of the plurality of objects, obtaining information on an affinity degree between the first object and at least a second object, the affinity degree being based on the associated parameters; the user interface providing the user with a feedback indicative of the affinity degree between the selected first object and the at least second of the plurality of objects; wherein the feedback includes a sensorial representation of the affinity degree based on a magnetic metaphor.

In a second aspect of the invention the objects represent functional blocks in a workflow execution environment including a user interface allowing the combination of functional blocks in order to create workflow processing applications. The functional blocks can exchange information data through input/output interface parameters and the affinity degree is indicative of the likelihood that the combination of the couple of functional blocks is successful.

In another aspect of the present invention the sensorial representation of the affinity degree is a visual representation and the user interface is a graphical user interface.

In a further aspect of the invention obtaining information on an affinity degree between the first object and at least a second object, includes interrogating a repository containing information on an affinity degree between each couple of the plurality of objects. The repository can contain information on successfulness of previously executed combinations among functional blocks.

In another aspect of the invention the at least second object is selected according to the position of the first object on the user interface.

In a further aspect of the present invention the magnetic metaphor includes a visual representation of the attraction among objects, wherein the attraction between the first and the second object is proportional to the corresponding affinity degree.

In another possible implementation the sensorial feedback includes a mechanical feedback.

In yet another aspect of the present invention we provide a data processing system which includes components adapted to implement the above method.

A still further aspect of the present invention provides a computer program for performing the above described method.

The present invention provides a methodology for assisting a user in the combination of objects (e.g. functional blocks) through an intuitive user interface which, according to a preferred embodiment, is construed to simulate the effect of magnets: the likelihood that a combination of two or more blocks can provide good results or not is referred in the following paragraphs as affinity degree; a high affinity degree between two blocks is represented in a magnetic-like style as a simulated attraction giving a feedback to the user. Such attraction feedback can be represented in several different ways, from a simple visual representation to a proper mechanical feedback conveyed to the user through the input device used for making the block selection (e.g. a mouse, a track point or a joystick).

Further embodiments of the invention are provided in the appended dependent claims.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1A:
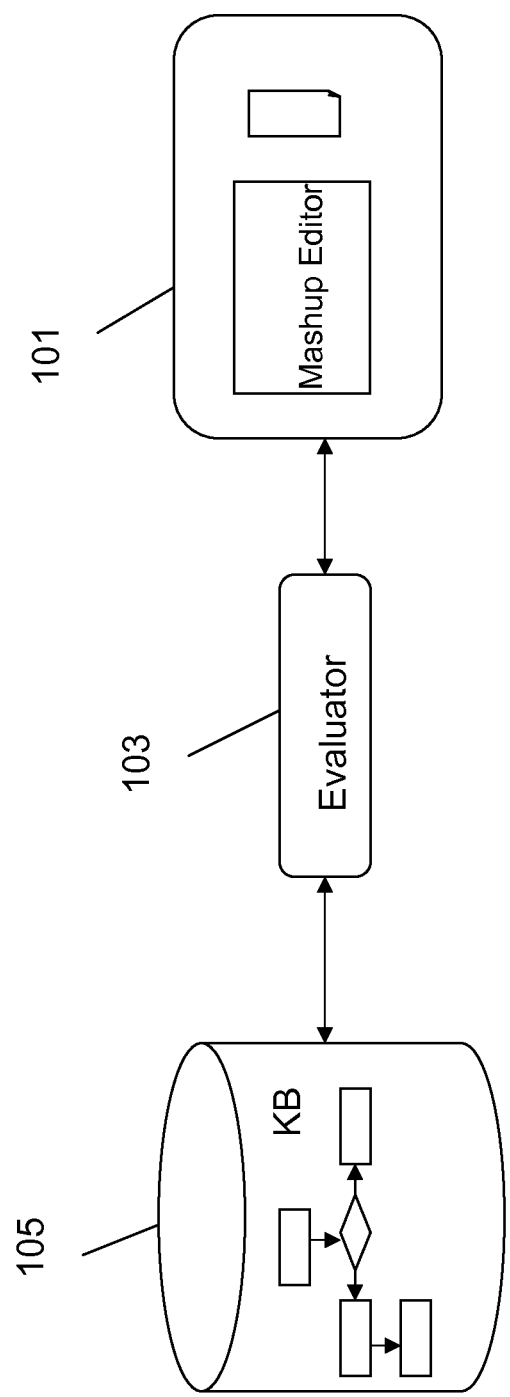
FIG. 1a is a schematic block diagram of a system implementing the method according to a preferred embodiment of the present invention.
Figure 1B:
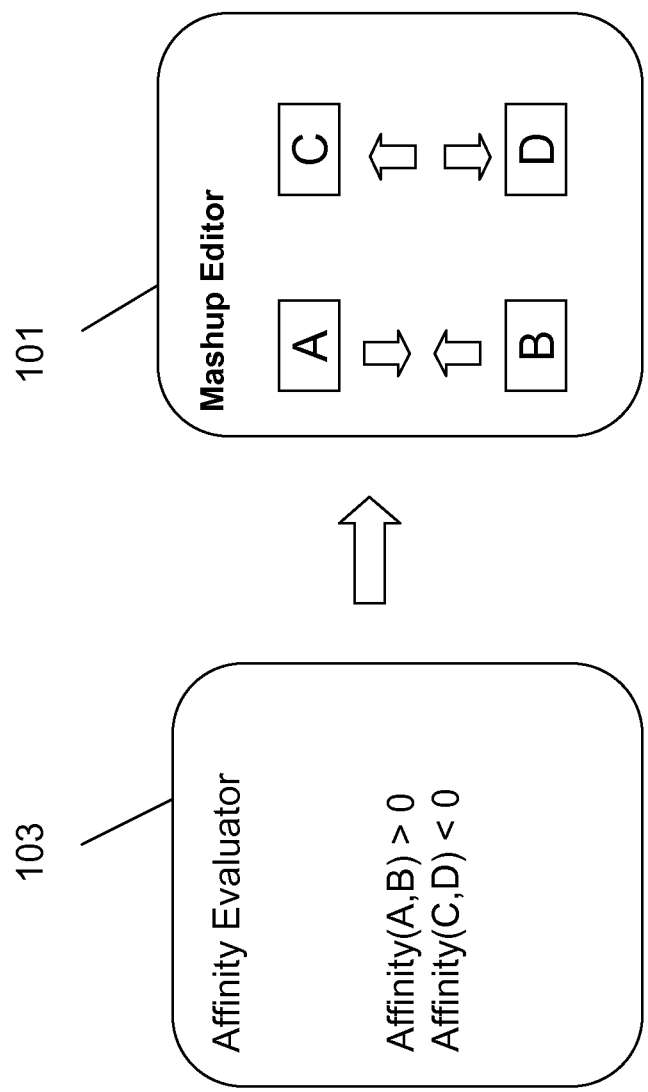
FIG. 1b shows a schematic example of the relationship between the affinity degree and the user interface representation.

With reference to FIG. 1a a system according to a preferred embodiment of the present invention is illustrated. The system is designed as a tool for managing a plurality of functional blocks; a user must be able to select some of the functional blocks and combine them together assisted by an intuitive user interface. The functional blocks can represent e.g. Web Services or basic procedures referred to the application domain or common operations such as math or transformation functions. An editor module 101 allows the user to perform the actions on the functional blocks, including create/edit or execute mashup actions: these actions can include e.g. cut & paste, rotate, resize and connect functional blocks. An Evaluator module 103 accesses a Knowledge Base 105 where information on affinity degree among each couple of blocks is available. As shown in FIG. 1b the user interface (e.g. the Mash-Up editor 101) represents in an easily intuitive way the reciprocal affinity of couples (or groups) of functional blocks, according to the information available to the affinity Evaluator 103. Such information can be retrieved in a repository (e.g. the Knowledge Base 105) which can be maintained by the system itself or remotely accessed e.g. through a network. According to such affinity degree the editor module, through a user interface (e.g. a visual user interface), assists the user in selecting the most appropriate combination of blocks in order to obtain a "MashUp" with the highest possible likelihood of being successful. In a preferred embodiment of the present invention such Affinity Degree (or Affinity score) can be represented with positive, neutral or negative value to give an intuitive indication of the likelihood that the combination of such couple of blocks can give good results or not, not only in a "syntactic" way, but also from a "semantic" point of view. With syntactic combination we mean the matching of input/output interoperabilities (interfaces), while with semantic combination we mean a more complex matching which involves the "semantic" of the information exchanged, not only its representation. In other words, two blocks could be perfectly compatible from an interface point of view, so that they can exchange information in the right format, but nevertheless will not bring to any useful results because the content of such information do not "match" one each other. In the example of the MashUp environment where a plurality of Web Services can be combined together for a succession of data processing, they need to be "physically" combined to create the full flow of data processing where one (or more) web service is invoked, but they also need to provide the right service, i.e. the correct processing in term of expected results. As mentioned above other implementations (other than web services) are possible with the same architecture, e.g. instead of web services, the functional blocks could represent any kind of self contained unit of work within a workflow process, like for instance the invocation of a subroutine.

With the term MashUp it is here meant Web applications which are created by combining several Web Services. With the term MashUp Environment it is here meant a web application which facilitates both the creation of MashUps (including processing flows combined together into a single MashUp) and the execution of such MashUps.

The system according to a preferred embodiment of the present invention requires that a database containing information on the affinity degree among blocks is available (e.g. the knowledge base 105). The present system is independent from the way of building such knowledge base which can be organized in several different embodiments. See as example patent application no. PCT/IT2009/000591 filed on 30 Dec. 2009 by the same applicant with the title "Method and system for ranking affinity degree among functional blocks". In this cited patent application a system and method are disclosed which perform the evaluation of the affinity degree among blocks taking into account the available historic statistics, i.e. the successfulness of previous combinations of the same couple (or group) of functional blocks. An optional additional factor which is considered in the method disclosed in the same patent application is the indication coming from tags previously assigned by the users or derived by Social Network activities.

Those skilled in the art will appreciate that the method disclosed in the present invention can be applied to several different environments. Furthermore the meaning of "affinity" can assume several different aspects. As another example, items to be combined together according to their affinity could be electronic documents (e.g. files in a file system) where the affinity degree is indicative of the number of predetermined keywords being contained in both items.

According to a preferred embodiment of the present invention, the editor module 101 includes a user interface which is able to interact with a user through sensorial feedbacks. In a preferred embodiment of the present invention the representation of affinity degree among blocks uses the magnetic metaphor, i.e. a higher affinity degree is represented by a stronger magnetic attraction between two blocks. Such magnetic attraction can be represented in several manners, e.g. with graphical representation or with e.g. a mechanical feedback, such as the mouse vibrating or producing a motion effect which could give the intuitive impression of attraction/repulsion. Another possibility is that of modifying the speed of the cursor movement in relation to the higher or lower attraction (or even neutral or negative attraction, i.e. repulsion). Yet another possible implementation is that of making more difficult the movement of the cursor when it is controlled by a trackpoint or a joystick, i.e. the trackpoint or joystick movements are stiffened to simulate a lower attraction or repulsion. The user will get the impression of using magnets which are easily or with difficulty combined together according to relative polarities. In some cases it might even be impossible to combine two blocks if the compatibility between them is particularly low (or negative).

Figure 2:
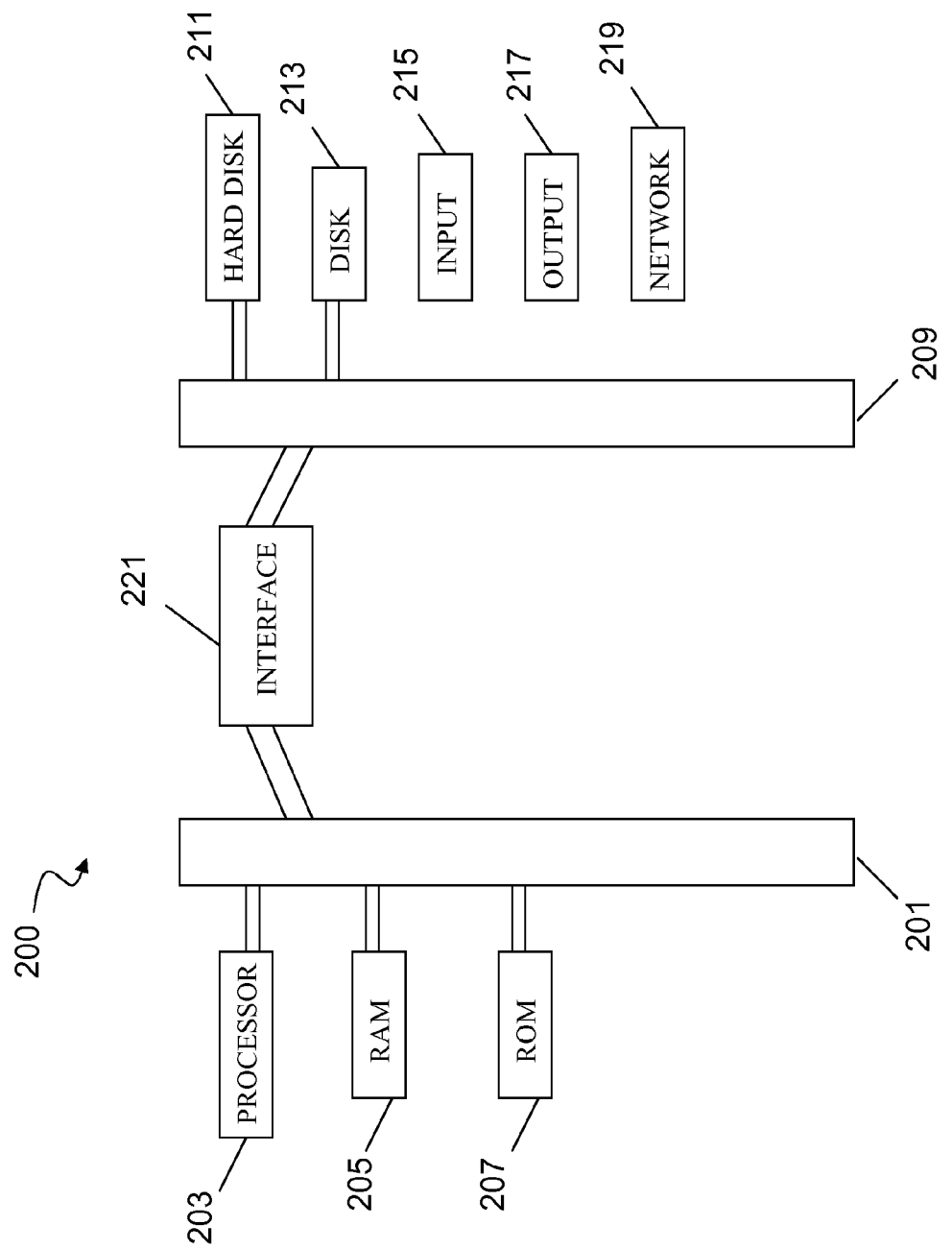
FIG. 2 shows the components of a generic computer system used in the preferred embodiment of the invention.

As shown in FIG. 2, a generic computer of the system (e.g. mobile computer unit, server, repository, network router) is denoted with 200. The computer 200 is formed by several units that are connected in parallel to a system bus 201. In detail, one or more microprocessors 203 control operation of the computer 200; a RAM 205 is directly used as a working memory by the microprocessors 203, and a ROM 207 stores basic code for a bootstrap of the computer 200. Peripheral units are clustered around a local bus 209 (by means of respective interfaces). Particularly, a mass memory consists of a hard-disk 211 and a drive 213 for reading CD-ROMs. Moreover, the computer 200 includes input devices 215 (for example, a keyboard and a mouse), and output devices 217 (for example, a monitor and a printer). A Network Interface 219 is used to connect the computer 200 to the network: the network can be either a wired network or a wireless telecommunication network. An interface 221 puts in communication the system bus 201 with the local bus 209. Each of the microprocessor 203 and the interface unit 221 can operate as master agents requesting an access to the system bus 201 for transmitting information.

Similar considerations apply if the system has a different topology, or it is based on other networks. Alternatively, the computers may have a different structure, include equivalent units, or consist of other data processing entities (such as PDAs, mobile phones, and the like).

Figure 3A:
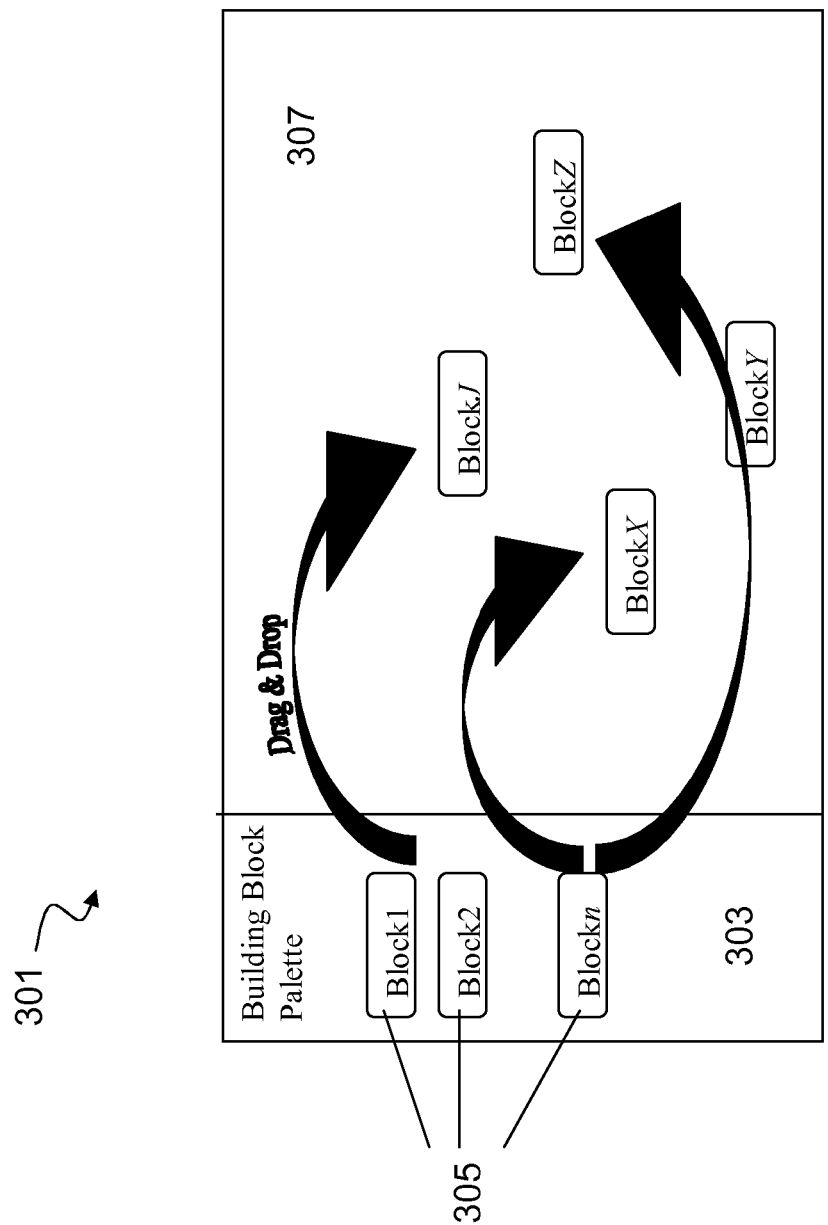
FIGS. 3a and 3b are schematic representation of a possible implementation of the present invention, including a building block palette and an editor area.
Figure 3B:
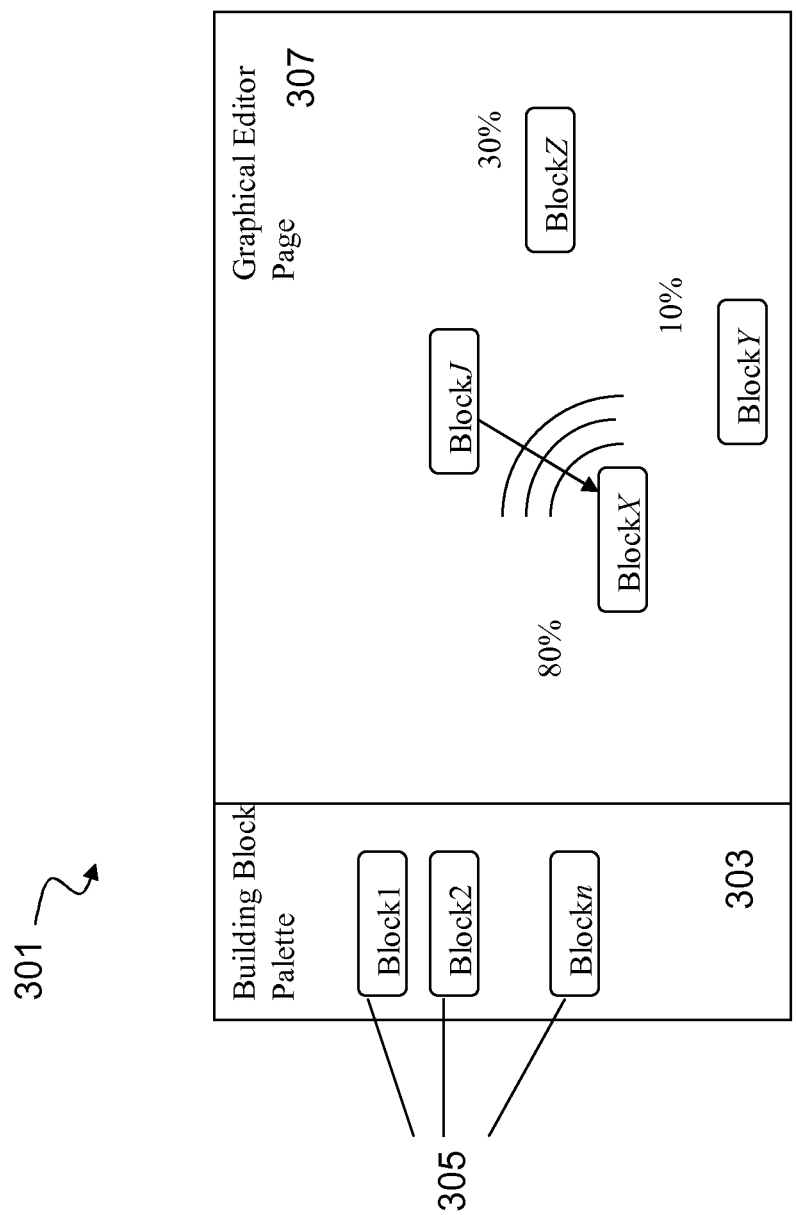

Possible implementations of an interface according to an embodiment of the present invention are shown in FIGS. 3*a* and 3*b*. A graphic editor 301 is composed of a Building Block Palette area 303 containing a plurality of functional blocks 305. Such blocks can be dragged and dropped to the MashUp area 307. When a user selects one of the blocks, e.g. BlockJ as shown in FIG. 3*b*, and tries to combine the selected block with another block in the MashUp area, the affinity degree is represented either graphically or with a sensorial feedback conveyed to the user through the pointing device (e.g. the mouse or the trackpoint). In the present example the affinity degree is representative of the likelihood that a block is the successor of another block in a workflow. For instance, referring to the travel organization domain, we assume that Web Services are available for making reservations and arrangements for travel elements (e.g. Hotels, flights, trains, taxis, meeting rooms.). Let's suppose our history contains n MashUp instances (with n higher than a predetermined threshold) where it is possible to execute in succession the following services:

Flight Booking Service;
Taxi Booking Service;
Hotel Booking Service;
Meeting Room Booking Service.

The evaluation of affinity degree among blocks can rely on the availability of previously executed combinations among the same blocks and it would generally return a high affinity degree value, because of the compatibility among the above mentioned blocks.

The higher the probability that the two blocks have to be executed in strict sequence, the stronger the magnetic attraction will be.

In the present example, when the user selects one of the blocks (e.g. BlockJ in the example of FIG. 3*b*), the user interface communicates to the user an attraction to the block with a higher affinity degree. A possible implementation can include the automatic combination between two blocks if the user "drops" a selected block (i.e. a block which had been previously "dragged"), so that the dropped block is moved towards the block which is exercising the highest attraction (i.e. having the highest affinity degree with the selected block).

Figure 4:
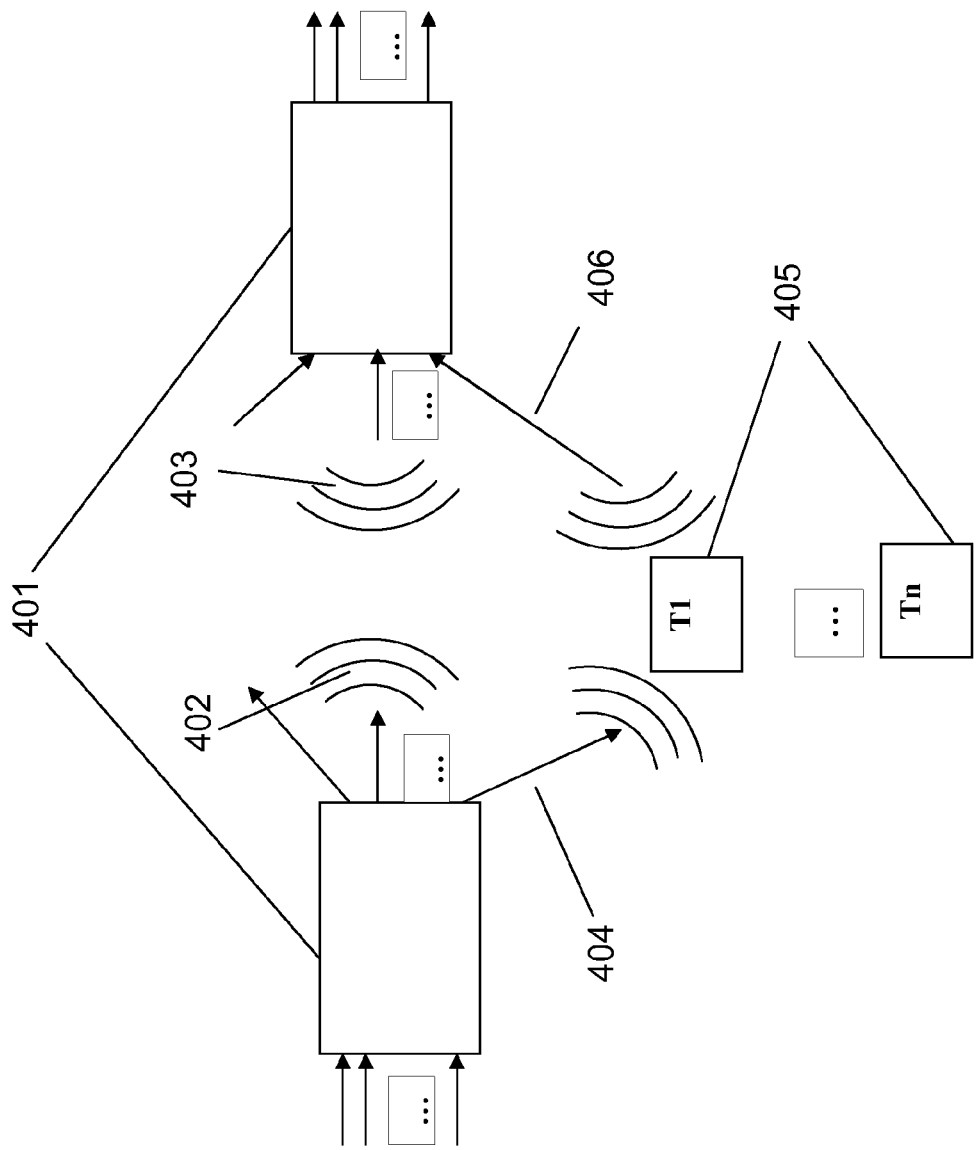
FIG. 4 shows a possible alternative implementation of the present invention.

Another possible implementation of an interface according to an embodiment of the present invention is shown in FIG. 4. The functional blocks affinity is determined by the input output parameters compatibility. The software layer dedicated to the determination of the affinity degree of the various blocks 401 assigns a high affinity degree between an output 402 and an input 403 connector related to the same parameter; otherwise a low degree is assigned to two connectors representing different data.

The user interface of the editor provides the user with a feedback which gives an intuitive perception of the affinity degree among components: when the user tries to combine (e.g. with drag and drop actions) two connectors having a high affinity degree, the user interface returns a simulated attraction force, while a low affinity degree will result in no attraction or even a simulated repulsion force. As mentioned above such attraction/repulsion force can be represented and transmitted to the user in various manners, from a simple visual representation to a proper mechanical feedback (e.g. through the mouse or the pointing device moving the cursor).

Moreover, the software layer dedicated to the evaluation of the affinity degree could keep into account not only the semantic meaning, but also the syntactic format of the parameters.

For instance, let's suppose that:
the parameters, represented by the connectors 404 and 406, are similar from the semantic point of view, but different from the syntactic one,
a few transformation functions T1, . . . , Tn, converting one format into another, are available in the considered context,
and, at last, that the transformation function T1 is able to convert the syntactic format, used by the parameter 404, into the one used for the parameter 406.

In this case the editor could return to the user a simulated attraction force between the parameter 404 and a format transformation function T1 (405) and then between the transformation function T1 and the parameter represented by the connector 406.

Figure 5:
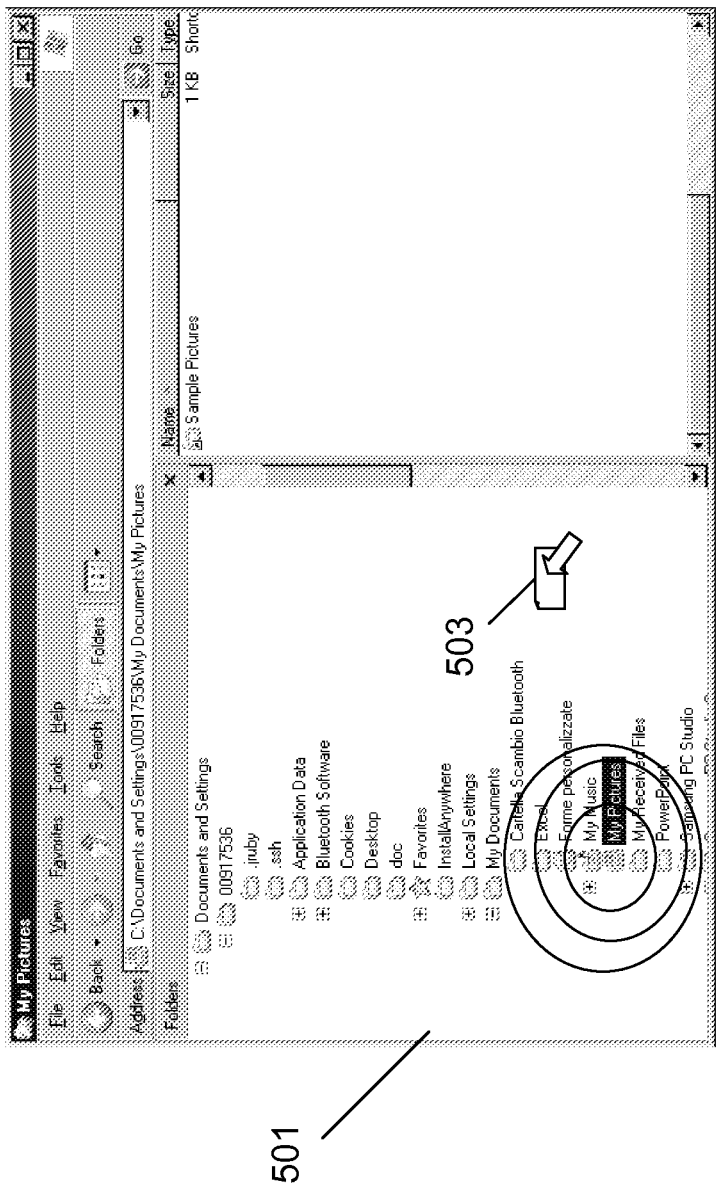
FIG. 5 shows a schematic representation of a further possible implementation, including a file system browser.

Another possible implementation of a method according to the present invention is schematically shown in FIG. 5. A file system browser 501 (e.g. Resource Explorer of Windows) is adapted to exploit a predetermined affinity degree among files. Let's suppose that the user wishes to save a picture in the folder C:\Documents and Settings\00917536\My Documents\My Pictures. The user selects the file 503 (e.g. from an incoming email) and drags it to the window representing the resource Explorer 501. The system "feels" the affinity of the file (containing a picture) with the folder MyPicture because of the suffix (e.g. .gif or .jpg). The affinity is represented graphically on the screen e.g. by highlighting the area around MyPicture in red, possibly with a brighter tone closer to the folder itself. In addition a mechanical feedback through the pointing device is transmitted to the user, or again an acceleration of the movement of the cursor is performed to emphasize the affinity of the file containing a picture with MyPicture folder. More advanced and complex affinity degree evaluations can be implemented by e.g. determining if common keywords are included in the dragged file and one or more of the sub-folders, e.g. by detecting the word "holiday" in the file and looking for an "holiday" folder. Those skilled in the art will appreciate that several different paradigms and rules can be implemented in the definition of the affinity degree.

Home networking is another possible field where an embodiment of the present invention can find an implementation, With "home networking" we mean a set of devices (e.g. computers, telephones, faxes, domestic appliances, videogames, alarms) connected through a data network (e.g. a LAN) and communicating and exchanging data among each other. They can normally be controlled and operated either from within the network or from remote (e.g. domotics implementation through the Internet). In this environment, it would be highly convenient for the users being able to build their own domestic applications which allow to control the various devices and have them interact with each other, to create a complete process flow.

As an example, let's suppose a user is wishing to organize a mountain trekking for the following day with a friend. Such trekking should be confirmed only in case of good weather conditions. The user would need to build a software application which self activates the following morning and checks the weather conditions (e.g. through a dedicated web service): in case of suitable weather conditions the application would activate the alarm to wake the user up, otherwise a text message (e.g. an SMS or an email) is sent to the friend to advise of the change of program.

The user could do that by using an interface according to a preferred embodiment of the present invention which allows the combination of predetermined functional blocks in an intuitive way: The functional blocks could, in this case, represent operations such as invoking web services, taking conditional decisions, activating home devices, issuing messages to predetermined recipients. Such blocks could be combined together by means of an intuitive user interface according to a preferred embodiment of the present invention, e.g. with the simulation of the magnetic effect which makes immediately evident which blocks are compatible with which other blocks.

Following this example, we suppose that the available blocks include the following: "alarm clock", "meteo", "SMS", "friend". A repository contains some affinity information among blocks. There are several ways according to which these affinities might have been collected, for example through monitoring of previous similar transactions and combinations as disclosed for example in patent application no. PCT/IT2009/000591, mentioned above.

The following pairs are examples of combinations having a positive affinity degree:
  "SMS" and "friend", considering also that the input/output interfaces of these two blocks require that a receiver input (friend) is associated to a sender output (SMS) and the data formats must be compatible;
  "meteo" and "alarm clock" or "SMS". "Meteo" returns a Boolean value according to which a decision can be taken and an action selected among a set (either "alarm clock" or "SMS").

When the user tries to create a link between the above couples, the user interface will provide a positive feedback (e.g. a simulation magnetic force which attract one of the blocks towards the other (or both blocks reciprocally). On the other hand, if the user attempts to combine blocks with low recorded affinity, no simulated attraction force (or other sensorial feedback) will be perceived by the user.

Let's try to build the application above for the mountain trekking:
  when the blocks "meteo" and "friend" are selected (e.g. by drag & drop from the palette to the desktop) no attraction force is represented (and transmitted to the user) because no positive affinity is found for such couple.

If the block "SMS" is then selected and brought to the canvas, such block is attracted by the block "friend" because, as mentioned above they have a high reciprocal affinity degree. Therefore the user would be "addressed" towards such combination. Another possible acceptable combination would be that of "SMS" with "meteo" (meteo being a prerequisite of "SMS"), but in the present case this combination has a lower affinity degree. The various affinity degrees can be established in several different ways, as mentioned above, thus bringing to different visual representation of the proposed combinations. The user will also have the opportunity of tuning or customizing such values to modify the relationships among blocks.

Following the trekking example, when the block "alarm clock" is selected, the visual interface should provide a positive sensorial feedback (e.g. a simulated attraction) between such block and "meteo" block.

Figure 6:
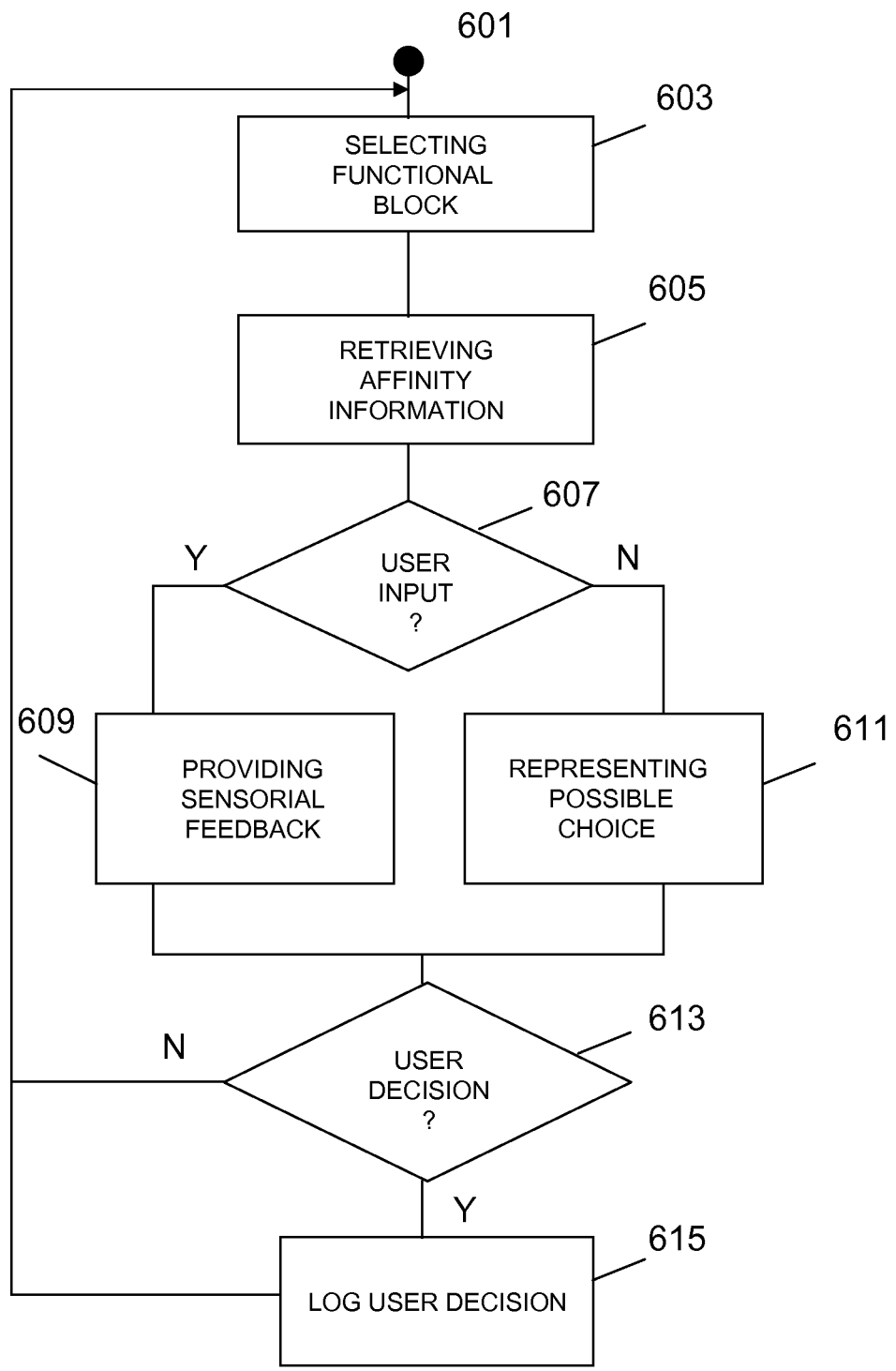
FIG. 6 shows a diagram describing the flow of activities relating to an illustrative implementation of the method.

With reference to FIG. 6, the logic flow of a method according to an embodiment of the invention is illustrated with a diagram. The method is described with reference to the operations of a user interface in a data processing system which is adapted to provide the user with sensorial feedback (e.g. visual, mechanical, sounds). The user interface represents a plurality of functional blocks (e.g. web services) which can be combined together by a user in order to create a process flow. In a preferred embodiment of the present invention the sensorial feedback provides a simulation of magnetic effect, e.g. by means of mechanical motion (e.g. vibration of a pointer device) among functional blocks, wherein the higher is a predetermined affinity degree among blocks, the stronger is the simulated magnetic attraction; similarly, the lower the levels of affinity below a predetermined threshold (i.e., in case of negative affinity assuming that a neutral affinity is characterized by a null value of an affinity parameter) the stronger the sensorial feedback in the form of a corresponding simulated repulsion, magnetic-like. The method begins at the black start circle 601 and goes to box 603, where the system detects the selection of at least one functional block by the user. Continuing to box 605, the system obtains information about affinity degrees among blocks which are available in a repository. Such information could be pre-existing and retrieved by the system, e.g. by accessing a repository, or calculated when needed according to available data. As mentioned above there are several possible ways for collecting (or calculating), maintaining and handling such affinity information: according to a preferred embodiment of the present invention the information about affinity degree among blocks are collected during the creation and the execution of mashups and combinations, so that a historic data base is built and updated, during operation of the system by a user for future re-use. At box 607 the system awaits for the user input: if the user makes any action (box 609), e.g. moves the selected block towards any other block on the user interface, the system assists the user by providing a sensorial indication of the affinity degree between the selected block and the block (or blocks) towards which the user is moving the selected block. As an alternative, the system could "push" the user towards a combination having a higher affinity degree. If no user action is detected (box 611) the system could represent the various affinity degrees through the user interface or, alternatively moving the selected block towards the block with the higher affinity degree. Those skilled in the art will appreciate that many different choices and implementations could be applied to modify the details of the described user interface and the possible feedbacks provided to the user. In a preferred embodiment of the present invention, the system monitors the mash-up environment to detect any possible completed combination of functional blocks and any execution of resulting processes (e.g. combination of web services). In general any decision taken by the user (through the input devices of the system) is detected (box 613) and it is possibly used to update the affinity repository (box 615), e.g. by refining the estimate of the current affinity degree. Then the control goes back to the beginning to detect the next block selection.

The invention or part of it can take the form of an entirely hardware embodiment, an entirely software embodiment or an embodiment containing both hardware and software elements. In a preferred embodiment, part of the invention is implemented in software, which includes but is not limited to firmware, resident software, microcode, etc.

Furthermore, the invention can take the form of a computer program product accessible from a computer-usable or computer-readable tangible medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of assisting a user in combining objects in a data processing system having a user interface including a plurality of objects, each object being associated with a set of parameters, the method comprising:
   responsive to receipt into the data processing system of a selection by the user of at least a first of the plurality of objects, obtaining information stored in the data processing system on an affinity degree between the first object and at least one second object, the affinity degree being based on the associated parameters; and
   providing to the user, from the data processing system through the user interface, a feedback indicative of the affinity degree between the selected first object and the at least one second object;
   wherein the feedback includes a sensorial representation of the affinity degree based on a magnetic metaphor in which the user is given, through the user interface, a sensation that the selected first object and the at least one second object are magnetically attracting or repelling each other, a sensorial representation of attraction in which the first object and one of the at least one second object are portrayed as being magnetically attracted to each other being representative of a positive feedback and a sensorial representation of repulsion in which the first object and the at least one second object are portrayed as being magnetically repelled from each other being representative of a negative feedback.

2. The method of claim 1, wherein the objects are functional blocks of a plurality of functional blocks in a workflow execution environment including a user interface allowing the combination of functional blocks in order to create workflow processing applications.

3. The method of claim 2, wherein the functional blocks exchange information data through input/output interface parameters and wherein the affinity degree is indicative of the likelihood that the combination of the couple of functional blocks is successful.

4. The method of claim 3, wherein the obtaining information on an affinity degree between the first object and at least a second object includes interrogating a repository containing information on an affinity degree between each couple of the plurality of objects.

5. The method of claim 4, wherein the repository contains information on whether previously executed combinations among functional blocks were successful.

6. The method of claim 1, wherein the sensorial representation of the affinity degree is a visual representation.

7. The method of claim 6, wherein the visual representation comprises a graphical representation of the attraction or repulsion.

8. The method of claim 6, wherein the visual representation comprises a modification of a speed of a cursor movement to represent the attraction or repulsion.

9. The method of claim 1, wherein the user interface is a graphical user interface.

10. The method of claim 1, wherein the obtaining information on an affinity degree between the first object and at least a second object includes interrogating a repository containing information on an affinity degree between each couple of the plurality of objects.

11. The method of claim 1, wherein the at least second object is selected according to the position of the first object on the user interface.

12. The method of claim 1, wherein the magnetic metaphor includes a visual representation of the attraction or repulsion among objects, wherein the attraction or repulsion between the first and the second object is proportional to the corresponding affinity degree.

13. The method of claim 1, wherein the sensorial feedback includes a mechanical feedback.

14. The method of claim 13, wherein the mechanical feedback comprises a vibrating or motion effect to represent the attraction or repulsion.

15. The method of claim 13, wherein the mechanical feedback comprises a change in difficulty of movement of a cursor to represent the attraction or repulsion.

16. A data processing system for assisting a user of a computer implemented workflow execution environment in combining functional blocks of a plurality of functional blocks, the workflow execution environment including a user interface allowing the combination of functional blocks in order to create workflow processing applications wherein the functional blocks exchange information data through input/output interface parameters, the system comprising:

circuitry configured to store information on an affinity degree between each couple of the plurality of functional blocks, the affinity degree being indicative of the likelihood that the combination of the couple of functional blocks is successful; and allow a user to select at least a first of the plurality of functional blocks, the input/output device being configured to provide a feedback, based on a magnetic metaphor in which the user is given, through the user interface, a sensation that the selected first object and the at least one second object are magnetically attracting or repelling each other, to the user indicative of the affinity degree between the selected first functional block and at least one second of the plurality of functional blocks, a sensorial representation of attraction in which the first object and one of the at least one second object are portrayed as being magnetically attracted to each other being representative of a positive feedback and a sensorial representation of repulsion in which the first object and the at least one second object are portrayed as being magnetically repelled from each other being representative of a negative feedback.

17. The data processing system of claim 16, wherein the input/output device is configured to provide the user with a sensorial feedback.

18. The data processing system of claim 17, wherein the sensorial feedback includes a mechanical feedback.

19. A non-transitory computer readable medium comprising computer executable instructions that, when executed on a computer, cause the computer to perform a method comprising:

responsive to receipt into the computer of a selection by the user of at least a first of the plurality of objects, obtaining information stored in the computer on an affinity degree between the first object and at least one second object, the affinity degree being based on the associated parameters; and providing to the user through a user interface a feedback indicative of the affinity degree between the selected first object and the at least one second object;

wherein the feedback includes a sensorial representation of the affinity degree based on a magnetic metaphor in which the user is given, through the user interface, a sensation that the selected first object and the at least one second object are magnetically attracting or repelling each other, a sensorial representation of attraction in which the first object and the at least one second object are portrayed as being magnetically attracted to each other being representative of a positive feedback and a sensorial representation of repulsion in which the first object and the at least one second object are portrayed as being magnetically repelled from each other being representative of a negative feedback.

* * * * *